United States Patent
Haertel et al.

(10) Patent No.: US 8,135,935 B2
(45) Date of Patent: Mar. 13, 2012

(54) ECC IMPLEMENTATION IN NON-ECC COMPONENTS

(75) Inventors: Michael John Haertel, Portland, OR (US); R. Stephen Polzin, San Jose, CA (US); Andrej Kocev, York, ME (US); Maurice Bennet Steinman, Marlborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 764 days.

(21) Appl. No.: 11/725,922

(22) Filed: Mar. 20, 2007

(65) Prior Publication Data

US 2008/0235485 A1    Sep. 25, 2008

(51) Int. Cl.
G06F 12/10    (2006.01)
G06F 11/08    (2006.01)

(52) U.S. Cl. ............. 711/202; 711/5; 711/E12.058; 714/52; 714/702; 714/E11.041; 714/E11.087

(58) Field of Classification Search ............ 711/203
See application file for complete search history.

(56) References Cited

U.S. PATENT DOCUMENTS

| | | | | |
|---|---|---|---|---|
| 4,727,474 | A | * | 2/1988 | Batcher ............... 712/14 |
| 5,263,032 | A | | 11/1993 | Porter et al. |
| 5,390,308 | A | * | 2/1995 | Ware et al. ........... 711/5 |
| 6,438,726 | B1 | | 8/2002 | Walters |
| 6,675,344 | B1 | | 1/2004 | Sharma |
| 6,965,537 | B1 | | 11/2005 | Klein |
| 7,308,621 | B2 | | 12/2007 | Adams |
| 2002/0083394 | A1 | * | 6/2002 | Hall et al. ........... 714/785 |
| 2002/0174398 | A1 | * | 11/2002 | Furutani ............. 714/776 |
| 2007/0061503 | A1 | * | 3/2007 | Chiang et al. ....... 711/103 |
| 2008/0094899 | A1 | * | 4/2008 | Honma et al. ....... 365/185.09 |

FOREIGN PATENT DOCUMENTS

WO    03/102965    12/2003

OTHER PUBLICATIONS

International Search Report and Written Opinion for PCT application No. PCT/US2008/003365 mailed Jul. 21, 2008.
Examination Report in application No. GB0916720.6 dated Jan. 20, 2011.
Examination Report in application No. GB0916720.6 dated Mar. 30, 2011.

* cited by examiner

Primary Examiner — Reginald Bragdon
Assistant Examiner — Daniel Bernard
(74) Attorney, Agent, or Firm — Meyertons, Hood, Kivlin, Kowert, Goetzel, P.C.; Erik A. Heter (57) ABSTRACT

A method and apparatus for implementation of error correction code (ECC) checking in non-ECC-compliant components. The method includes receiving a logical address, wherein the logical address maps to first and second physical addresses of a memory. The first and second physical addresses of the memory correspond to memory locations that store data and a corresponding ECC, respectively. The method further comprises translating the logical address into the first and second physical addresses, accessing the data over a data path, separately accessing the ECC over the same data path, and checking the integrity of the data using the ECC.

14 Claims, 6 Drawing Sheets

| | | | | | | | | | |
|---|---|---|---|---|---|---|---|---|---|
| Logical Address Bits | A8 | A7 | A6 | A5 | A4 | A3 | A2 | A1 | A0 |
| Logical Addresses Reserved for ECC's | 1 | 1 | 1 | x | x | x | x | x | x |
| Physical (Permuted) Address Provided to Memory | A5 | A4 | A3 | A8 | A7 | A6 | A2 | A1 | A0 |

Thus:

| | | | | | | | | | |
|---|---|---|---|---|---|---|---|---|---|
| For Data Stored in Range: | A5 | A4 | A3 | A8 | A7 | A6 | x | x | x |
| Corresponding ECC stored in Address | A5 | A4 | A3 | 1 | 1 | 1 | A2 | A1 | A0 |

ECC IMPLEMENTATION IN NON-ECC COMPONENTS

BACKGROUND OF THE INVENTION

1. Field of the Invention

This invention relates to computer systems, and more particularly, to error checking and correction in memory subsystems.

2. Description of the Related Art

Many high-end computer systems include within their memory subsystem a feature known as 'ECC'. ECC (error correcting codes, or alternatively, error checking and correction) is used to detect corrupted data in memory, and if possible, to correct the corrupted data. Data in memory may become corrupted by various sources, such as natural background radiation, electrical noise, failing components, and so forth.

ECC subsystems work by using the desired memory contents as a basis for computing additional bits to form the error correcting codes. Both the data and the bits making up the ECC are stored in memory. In some ECC-compliant systems, the bits comprising the ECC's may be stored separately from the data in which they protect (e.g., as in some RAID systems). In other ECC-compliant computer systems, special memory devices are used for storing data and the bits comprising the ECC. These memory devices require additional storage space (12.5% in one type) for storing the ECC's along with the protected data. The additional storage space in turn requires additional interconnections (i.e. connectors and circuit traces) to convey the additional bits between the memory controller and the memory. ECC memory components are used primarily in high-end computer systems, and thus their use has not become widespread enough to attain economies of scale. Thus, implementation of ECC in a memory subsystem may require significant additional cost.

In addition to the cost factor, implementation of ECC memory in some computer systems may be impractical. For example, physical space for implementing extra interconnections and storage space is significantly limited (if available at all) in laptop computer systems. Space may also be limited in some desktop computer systems as well. Thus it may not be possible to use ECC-compliant components in such system even if it is otherwise desirable to do so.

SUMMARY OF THE INVENTION

A method and apparatus for implementation of error correction code (ECC) checking in non-ECC-compliant components is disclosed. In one embodiment, the method includes receiving a logical address, wherein the logical address maps to first and second physical addresses of a memory. The first and second physical addresses of the memory correspond to memory locations that store data and a corresponding ECC, respectively. The method further comprises translating the logical address into the first and second physical addresses, accessing the data over a data path, separately accessing the ECC over the same data path, and checking the integrity of the data using the ECC.

In one embodiment, a memory subsystem includes a memory, a data path, and a memory controller coupled to the memory by a data path. The memory controller is coupled to receive a logical address and is configured to translate the logical address into first and second physical addresses. The first physical address corresponds to a memory location wherein data is stored, while the second physical address corresponds to a memory location wherein an ECC associated with the data is stored. The memory controller is further configured to access the data over the data path, separately access the ECC over the data path, and check the integrity of the data using the ECC.

In various embodiments, the storage of a portion of data and its associated ECC may be arranged such that it is in the same page or row of memory. In this manner, only a single row address (along with two separate column addresses) need be provided to access both the data and its corresponding ECC. Since only one row address is necessary, an access penalty (wherein a separate row must be precharged) may be avoided. In general, the arrangement of data and ECC's within a given memory device may be such that bits of data and bits of its corresponding ECC's may be stored in physically adjacent locations.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 1:
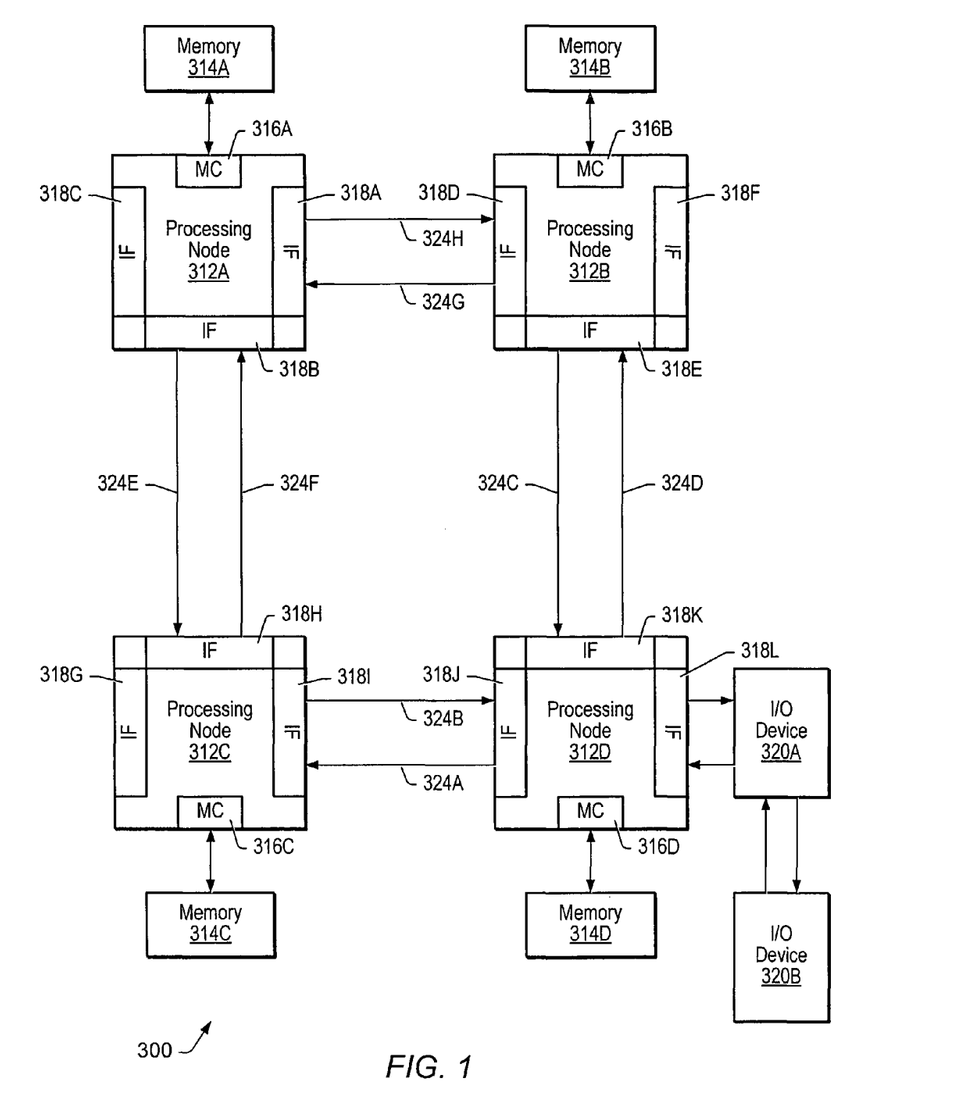
FIG. 1 is a drawing of one embodiment of a computer system.

Turning now to FIG. 1, an embodiment of a computer system 300 is shown. In the embodiment of FIG. 1, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Figure 4:
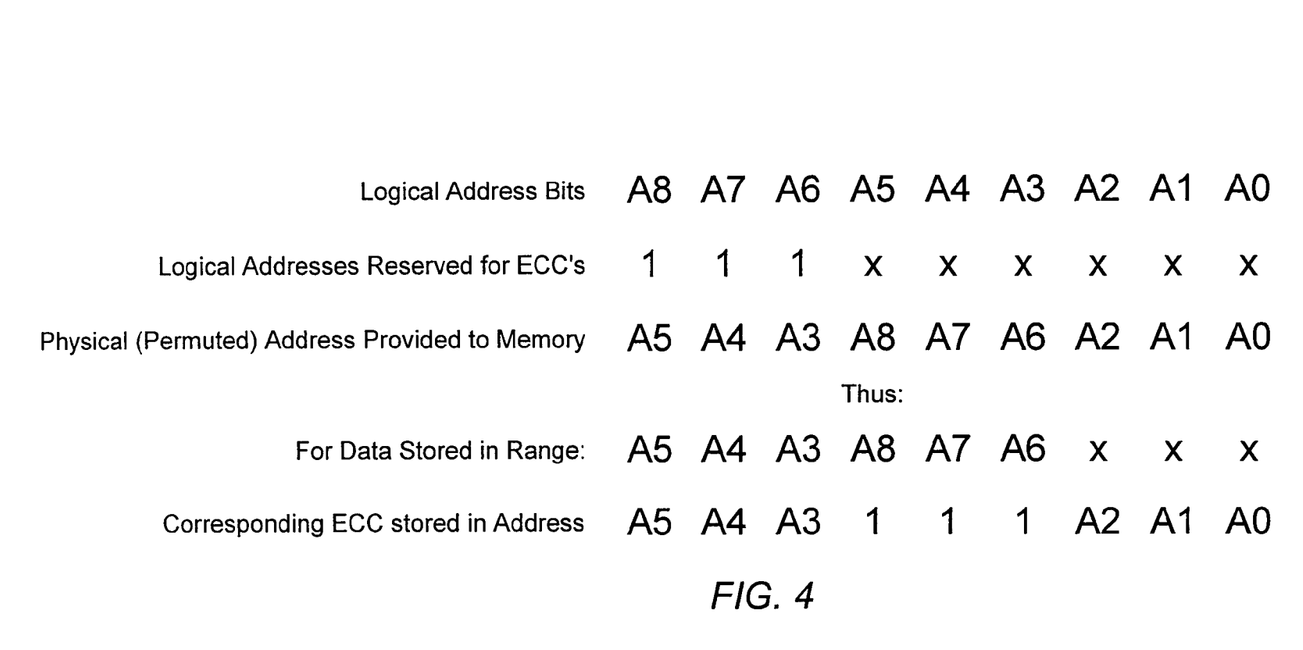
FIG. 4 is a drawing illustrating one embodiment of a method for permuting address bits in order to insure that data and its associated ECC's are stored in the same page of memory.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 4. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCD bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 4. Any suitable routing algorithm may be used. Other embodiments of computer system 300 may include more or fewer processing nodes then the embodiment shown in FIG. 4.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 1 (e.g. including various structural and operational details shown in FIGS. 2-3). One or more processors may comprise a chip multiprocessing (CMP) or chip multi-threaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Furthermore, one or more processors 10 may be implemented in a more traditional personal computer (PC) structure including one or more interfaces of the processors to a bridge to one or more I/O interconnects and/or memory.

Figure 2:
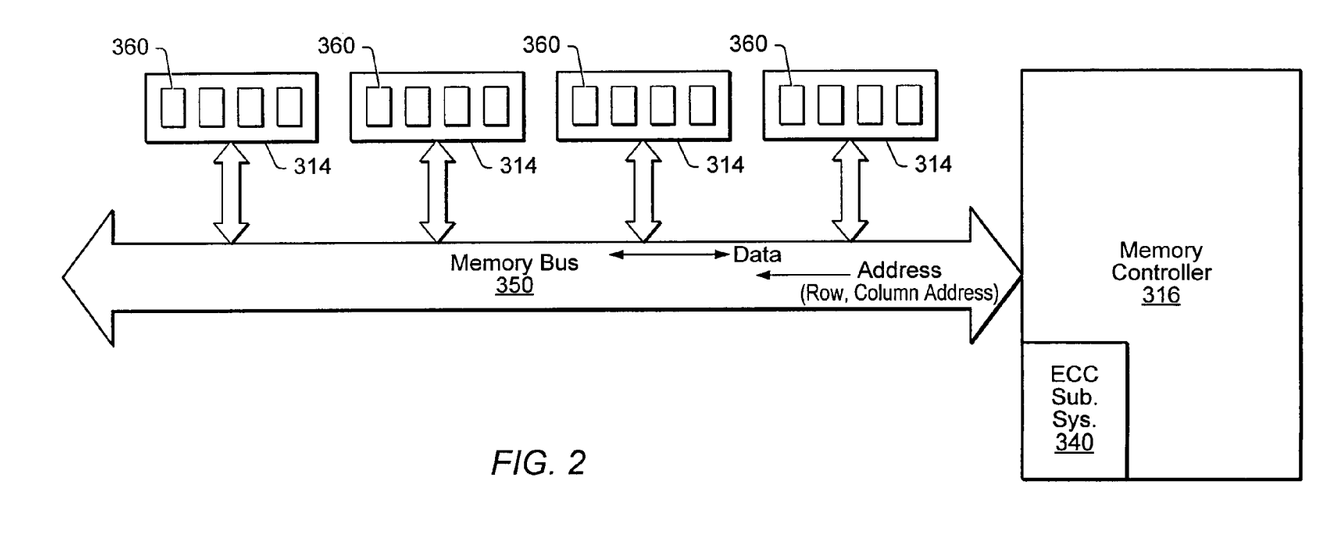
FIG. 2 is a drawing of one embodiment of a memory subsystem.

Turning now to FIG. 2, a drawing of one embodiment of a memory subsystem is shown. In the embodiment shown, the memory subsystem includes a memory having a plurality of memory modules 314. Each memory module 314 includes a plurality of memory devices 360. The specific number of memory modules 314 and memory devices 360 on each module may vary with different embodiments according to parameters such as the size (and maximum possible size) of the memory, number of connectors, cache line size, and other common factors.

Memory modules 314 are coupled to memory controller 316 via a memory bus 350. Memory bus 350 may be configured to convey data and address signals between memory modules 314 and memory controller 316. Data signals may be conveyed to or from memory modules 314 via a data path that is part of memory bus 350. Address signals may be conveyed to memory modules 314 from memory controller 316, and may include separate row address signals (for selecting a row of memory) and column address signals (for selecting a particular address in a row) that may be transmitted at separate times. Data and error correction codes (ECC's) may be stored in the memory modules across the various memory devices 360. For example, if a memory module 314 includes eight memory devices 360, a byte of data may be stored by storing one bit of the byte in each of the memory devices.

Memory controller 316 includes an ECC subsystem 340, which may be used to verify the integrity of data read from memory, and in some cases, correct any errors that may be present. ECC subsystem 340 may utilize one of several different well-known methods of generating ECC's for protected data.

In one embodiment, memory modules 314 are not ECC-compliant (as understood by the present state of the art) memory modules. However, memory space may be reserved within memory modules 314 in order to store ECC's. For example, in one embodiment, 1/8 of the available address space of the memory module may be reserved for ECC's, while the remaining 7/8 may be reserved for storing data. The portion of memory reserved for ECC's may be invisible to applications, and thus is used only by ECC subsystem 340 in memory controller 316. The division of memory address space into addresses reserved for storing data and those reserved for storing ECC's will now be discussed in further detail in conjunction with FIG. 3.

Figure 3:
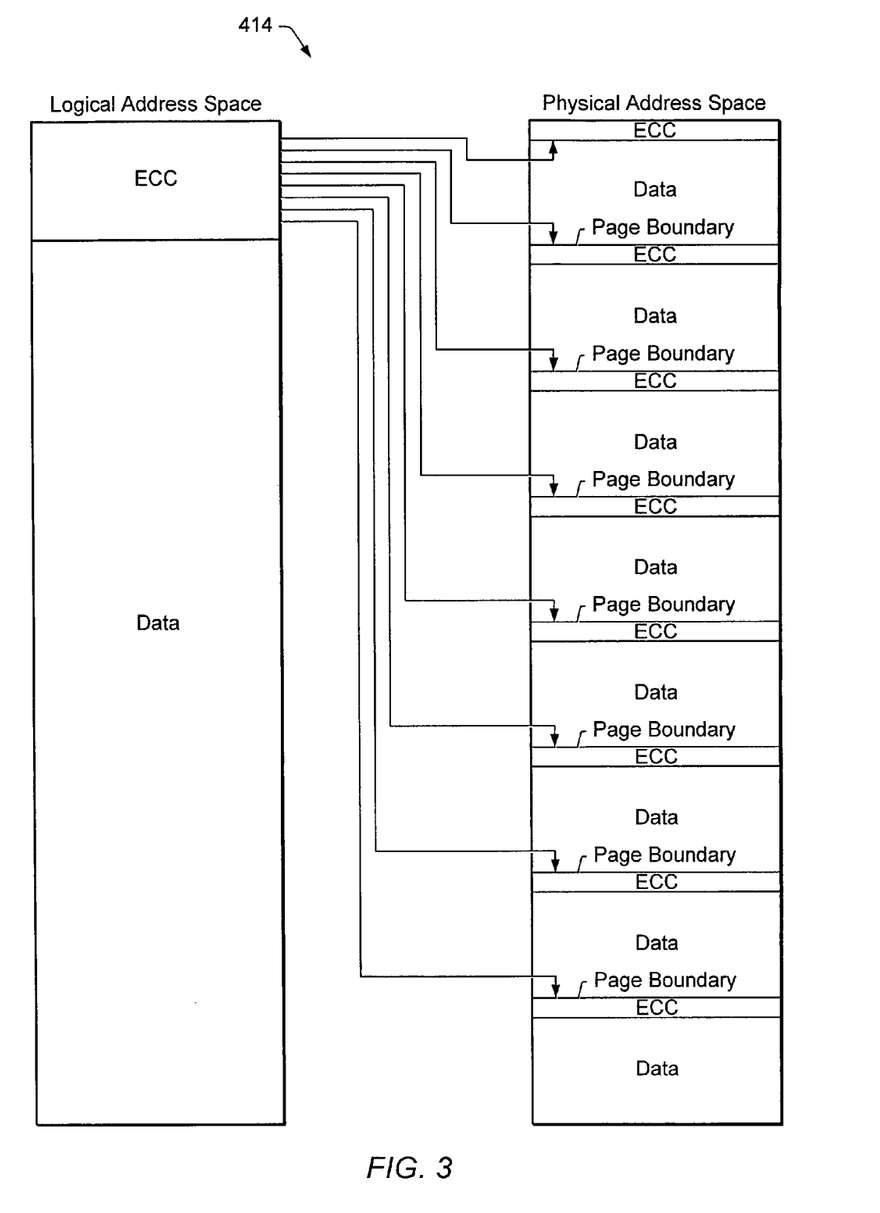
FIG. 3 is a drawing illustrating the addressing of one embodiment of a memory wherein portions therein are reserved for storing error correction codes (ECC's)

FIG. 3 is a drawing illustrating the addressing of one embodiment of a memory wherein portions therein are reserved for storing ECC's. In the embodiment shown, memory 414 is shown as both a logical address space and a physical address space. In the logical address space, a small portion of the memory is reserved for storing ECC's, while the majority of the address space is reserved for storing data. Each of the stored ECC's corresponds to blocks of data stored in the address space reserved therefor. The address space reserved for storing data may be accessed by software applications that require memory for data storage and retrieval. In contrast, the address space reserved for storing ECC's may not be accessed by software applications, and may be invisible thereto. The portion for storing ECC's may be visible to an ECC subsystem such as that shown in FIG. 2.

In the physical address space, the data and corresponding ECC's are arranged according to pages, or rows of memory. In this particular embodiment, ECC's corresponding to a particular block of data are placed near the page boundary, with the data block in the same page. This allows for more efficient accesses, as a single row address may be sent for both the data to be accessed and its corresponding ECC. In other words, a unit of data and its corresponding ECC may be stored in the same row, but in different columns. By arranging the ECC's and corresponding data such that only a single row address need be sent to access both, an access penalty associated with precharging a row may be avoided. ECC's are thus stored in address locations adjacent to the data which they protect. In general, this arrangement results from reserving 1/n (e.g., 1/8 where n=8) addresses for storing ECC's and the remaining (n−1)/n (e.g., 7/8) addresses for storing data to be protected by ECC's.

Other arrangements of data and corresponding ECC's are possible and contemplated. For example, in one embodiment, the numeric address of every user-requested storage location may be multiplied by (n+1)/n (e.g., 9/8, where n=8) in order to compute the actual location in the memory that would be used to store corresponding ECC's. This would result in 1/n (e.g., 1/8) gaps between data blocks were ECC's may be stored.

FIG. 4 is a drawing illustrating one embodiment of a method for permuting address bits in order to insure that data and its associated ECC's are stored in the same page of memory. In the embodiment shown, a certain portion of the logical address space (shown here as A8 A7 A6 A5 A4 A3 A2 A1 A0) is reserved for storing ECC's. More particularly, the highest usable logical address for storing data in this example is 110_111_111. Accordingly, all logical addresses 111_xxx_xxx in this example are reserved for storing ECC's, while the remaining logical addresses are reserved for storing data.

In order to reserve a physical address space for storing ECC's corresponding to a range of data, the address bits may be permuted. Thus, as shown in the drawing, for one particular range of physical addresses, the physical address for corresponding ECC's may be obtained by permuting (i.e. swapping) certain address bits. In this example, the address bits A8, A7 and A6 are swapped with address bits A5, A4, and A3 in order to obtain the physical address for storing a corresponding ECC. The resulting address provided to memory is A5 A4 A3 A8 A7 A6 A2 A1 A0. Thus, for data stored in the range of physical addresses A5 A4 A3 A8 A7 A6 x x x, the corresponding ECC may be stored in physical address A5 A4 A3 1 1 1 A2 A1 A0.

Permuting address bits in this manner may allow for more efficient accesses of data and corresponding ECC's. The address bits may be permuted in such a manner (such as in the above example) that the ECC's are stored within the same page as the corresponding blocks of data, and may also be stored on a page boundary as shown in FIG. 3. Thus, for a page of memory corresponding to a single row address, both the data and its corresponding ECC will be stored in the same row, but different columns. Therefore, a single row address may be sent for accessing both the ECC and the data, with their corresponding column addresses being sent separately. In this manner, an access of both a block of data and a corresponding ECC requires only one precharge cycle instead of the two that may otherwise be required to access information from two different row addresses, thereby minimizing the latency of the access.

Figure 5:
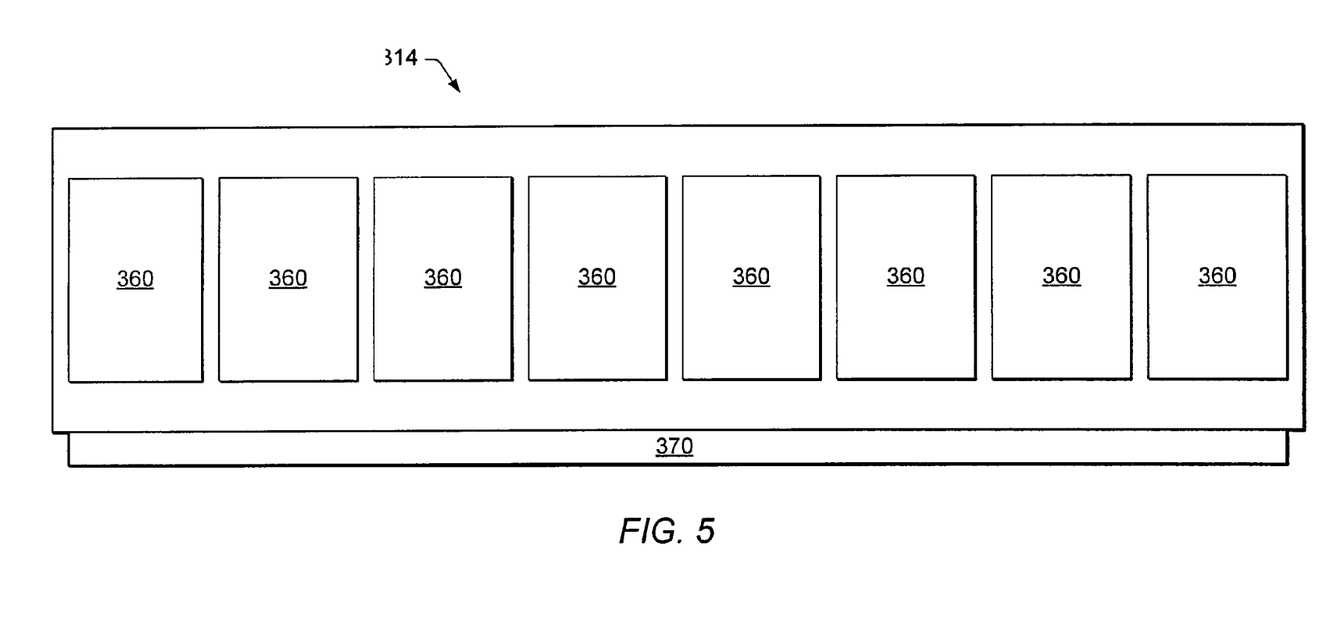
FIG. 5 is a drawing illustrating one embodiment of a memory module.

FIG. 5 is a drawing illustrating one embodiment of a memory module. In the embodiment shown, memory module 314 is not an ECC-compliant memory module as understood in the present state of the art. In state-of-the-art ECC-compliant memory modules, there is typically provided extra storage exclusively for ECC's. This extra storage may be provided by extra memory devices mounted on the PCB (printed circuit board) of the memory module. In addition, the data path between the ECC-compliant memory modules (and ECC-compliant memory in general) is wider to allow the ECC's to be concurrently conveyed with corresponding protected data.

In contrast, memory module 314 shown in FIG. 5 is designed for data storage without any particular consideration of ECC compliance. Nevertheless, using the techniques disclosed herein, the use of ECC's may be implemented in these types of memory modules.

In this particular embodiment, memory module 314 includes eight memory devices 360. Each of the memory devices 360 may store a part of a data block and part of an ECC. For example, a byte (eight bits) may be stored in memory module 314 by storing one bit of the byte in each of the eight memory devices. Similarly, each memory device 360 may store one bit of an eight-bit ECC. Thus, the storage of data and ECC's may be spread across the plurality of memory devices of memory module 314. Such an arrangement may nevertheless be suitable for arranging the stored data and ECC's in accordance with the map of the physical address space discussed previously in conjunction with FIG. 3.

Memory module 314 also includes connector 370, which enables the memory module to be coupled to a memory bus. Connector 370 may be a card-edge or any other type of suitable connector. The width of the data portion of the connection (in terms of the number of bits) may be in accordance with the cache line of the system in which it is to be used. If the system is not otherwise ECC-compliant, the cache line will be wide enough to accommodate the transfer of data, but not wide enough to accommodate the concurrent transfer of ECC's. As will be discussed in further detail below, the ECC's in such an embodiment may be conveyed across the data bus in a transfer separate from the transfer of data.

Figure 6:
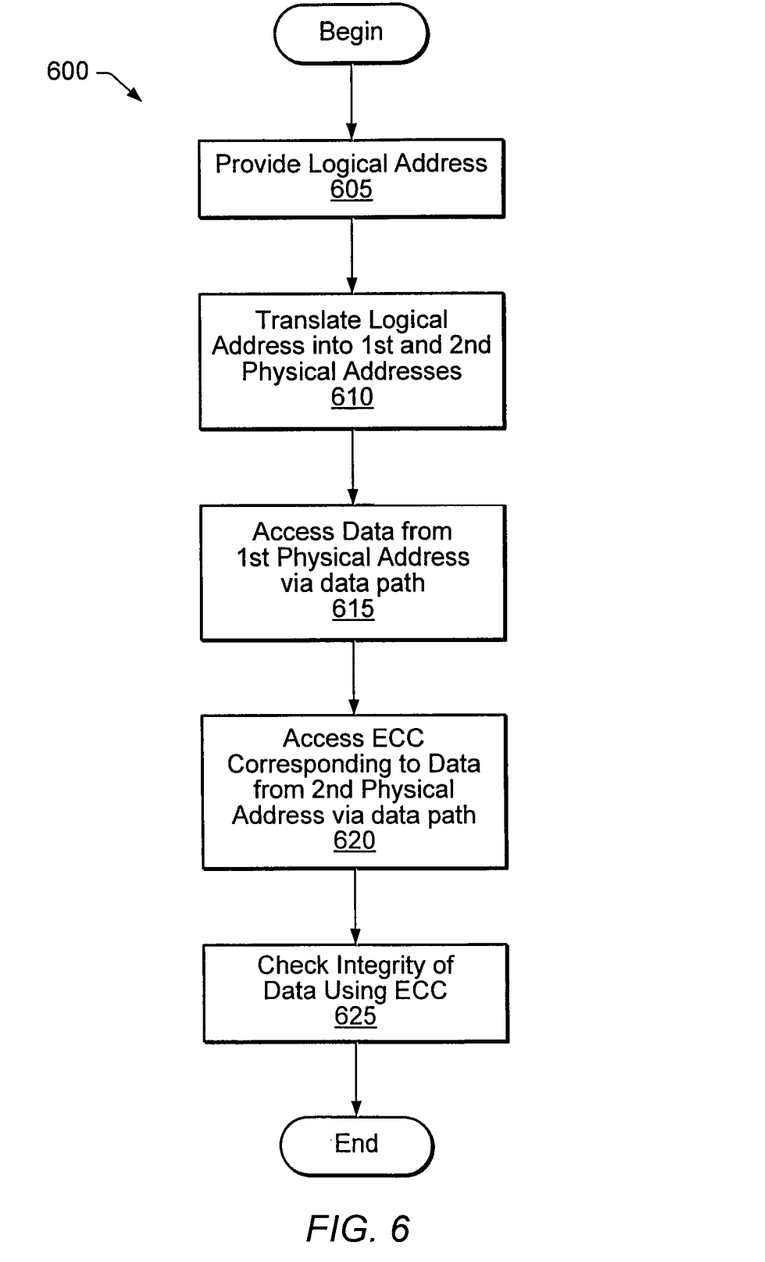
FIG. 6 is a flow diagram of one embodiment of verifying the integrity of data using an ECC subsystem with non-ECC compliant memory devices.

FIG. 6 is a flow diagram of one embodiment of verifying the integrity of data using an ECC subsystem with non-ECC compliant memory devices. In the embodiment shown, method 600 begins with the provision of a logical address (605). The logical address may be provided by software executing on a computer system to a memory controller. After receiving the logical address, the memory controller may then translate the logical address into first and second physical addresses (610). The first of these physical addresses may correspond to a block of data stored in the memory, while a second physical address corresponds to an ECC used to check the integrity of the block of data. In one embodiment, the logical address may translate to a single row address and two separate column addresses. The first column address (along with the row address) corresponds to a location where the data block is stored, while the second column address (along with the same row address) corresponds to the ECC associated with the data block.

Upon translation of the logical address into the first and second physical addresses, data may be accessed from the first physical address over a data path during a first cycle (615). Since the memory system is not explicitly designed for a standard form factor that is ECC-compliant, the ECC corresponding to the data is accessed over the same data path in a separate, second cycle (620). Thus, given the reserving of address space for ECC's and accessing them in cycles separate from that in which data is accessed enables the disclosed implementation of ECC in devices that were otherwise not expressly designed to be ECC-compliant. After accessing both the data and its corresponding ECC, an ECC subsystem may then check the integrity of the data according to the ECC protocol (625). This step may also involve correcting data if possible upon detection of an error.

A method is also contemplated for generating and storing ECC's for data to be written into memory. The method contemplates receiving a logical address corresponding to a location where data is to be stored. A first physical address for storing the data is derived from translating the logical address. A second physical address for storing a corresponding ECC is derived using the logical address, which maps to a portion of the address space reserved for ECC storage. When the data is received, it may be used to generate a corresponding ECC according to a particular ECC protocol. The data may be written to the memory at the first physical address on a first cycle. On a second cycle, the ECC may be written to the second physical address. As with other embodiments discussed herein, the first and second physical addresses may both share a common row address but different column addresses.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
   receiving a logical address, wherein the logical address maps to a first physical address of a memory and a second physical address of the memory, wherein the first physical address is configured to store data and the second physical address configured to store an error correction code (ECC) corresponding to the data stored at the first physical address;
   translating the logical address into the first and second physical addresses, wherein translating the logical address into first and second physical addresses comprises permuting bits of the logical address such that the ECC's are stored in physical memory locations adjacent to physical locations in the memory in which data protected by the ECC's is stored, wherein said permuting is performed based on a page boundary, wherein the ECC's are stored adjacent to the page boundary such that a single row address and two column addresses are provided to access a block of data and its corresponding ECC;
   accessing the data from the first physical address over a data path;
   separately accessing the ECC over the data path; and
   checking integrity of the data using the ECC.

2. The method as recited in claim 1, wherein the first physical address is located in a memory page, and wherein the second physical address is located in the same memory page.

3. The method as recited in claim 2 wherein, for a given page of memory, a first subset of physical addresses is reserved for storing data and a second subset of address is reserved for storing ECC's, each of which is associated with data stored in a physical address of the first subset.

4. The method as recited in claim 1, wherein the second physical address is computed by multiplying the first physical address by $(n+1)/n$.

5. The method as recited in claim 1 further comprising storing the ECC's in blocks between blocks of data, wherein $1/n$ of the addresses are reserved for storing ECC's and $(n-1)/n$ of the addresses are reserved for storing data.

6. The method as recited in claim 1, wherein the memory is a memory module including a plurality of memory devices, and wherein the data and the ECC's are stored across the plurality of memory devices.

7. A memory subsystem comprising:
   a memory;
   a data path; and
   a memory controller coupled to the memory by the data path, wherein the memory controller is coupled to receive a logical address, and wherein the memory controller is configured to:
      translate the logical address into a first physical address of a memory and a second physical address of the memory, wherein the first physical address is configured to store data and the second physical address configured to store an error correction code (ECC) corresponding to the data stored at the first physical address, wherein the memory controller is configured to translate the logical address into first and second physical addresses by permuting bits of the logical address such that the ECC's are stored in physical memory locations adjacent to physical locations in the memory in which data protected by the ECC's is stored, wherein said permuting is performed based on a page boundary, and wherein the ECC's are stored adjacent to the page boundary such that a given block of data and its corresponding ECC are accessible by providing a single row address and two column addresses;
      access data from the first physical address in the memory via the data path;
      separately access the ECC from the second physical address via the data path; and
      check the integrity of the data using the ECC.

8. The memory subsystem as recited in claim 7 wherein, for a given page of memory, a first subset of physical addresses is reserved for storing data and a second subset of address is reserved for storing ECC's, each of which is associated with data stored in a physical address of the first subset.

9. The memory subsystem as recited in claim 7, wherein the first physical address includes a row address and a first column address, and wherein the second physical address includes the row address and a second column address.

10. The memory subsystem as recited in claim 7, and wherein the second physical address is computed by multiplying the first physical address by (n+1)/n.

11. The memory subsystem as recited in claim 7, wherein the ECC's are stored in blocks between blocks of data, wherein 1/n of the addresses are reserved for storing ECC's and (n−1)/n of the addresses are reserved for storing data.

12. The memory subsystem as recited in claim 7, wherein the memory is a memory module.

13. A method comprising:
reserving a first portion of a memory for storing data; and
reserving a second portion of the same memory for storing error correction codes (ECC's) protecting the data;
wherein a logical address maps to a first physical address in the first portion of the memory and a second physical address in the second portion of the memory; and
wherein the first physical address is located in a memory page, and wherein the second physical address is located in the same memory page, wherein the first and second physical addresses are obtained by permuting bits of the logical address such that the second physical address is adjacent to a page boundary, and wherein a given block of data and its corresponding ECC are accessible by providing a single row address and two column addresses.

14. The method as recited in claim 13, wherein the memory is a memory module including a plurality of memory devices, wherein the data and the ECC's are each stored across the plurality of memory devices.

* * * * *